(12) United States Patent
Gordon et al.

(10) Patent No.: US 8,863,190 B1
(45) Date of Patent: *Oct. 14, 2014

(54) METHOD AND APPARATUS FOR PROVIDING TARGETED ADVERTISEMENTS

(75) Inventors: Donald F. Gordon, Los Altos, CA (US); Sadik Bayrakeri, Foster City, CA (US); Edward A. Ludvig, Redwood City, CA (US); John P. Comito, Redwood City, CA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,283

(22) Filed: Jun. 28, 2011
(Under 37 CFR 1.47)

Related U.S. Application Data (63) Continuation of application No. 09/792,889, filed on Feb. 23, 2001, now Pat. No. 7,970,645.

(51) Int. Cl.
*G06F 13/00* (2006.01)

(52) U.S. Cl.
USPC .......... 725/46; 725/37; 725/39; 725/40; 725/41; 725/42; 725/43; 725/44; 725/45; 725/47; 725/51; 725/52; 725/53; 725/61

(58) Field of Classification Search
USPC .......................... 725/32–36, 39–56
See application file for complete search history.

(56) References Cited

U.S. PATENT DOCUMENTS

| | | | |
|---|---|---|---|
| 5,691,768 A * | 11/1997 | Civanlar et al. | 375/240.01 |
| 5,754,851 A | 5/1998 | Wissner | |
| 5,812,124 A * | 9/1998 | Eick et al. | 725/45 |
| 6,021,229 A | 2/2000 | Takashima et al. | |
| 6,029,045 A * | 2/2000 | Picco et al. | 725/34 |
| 6,064,376 A | 5/2000 | Berezowski et al. | |
| 6,177,931 B1 * | 1/2001 | Alexander et al. | 725/52 |
| 6,208,335 B1 | 3/2001 | Gordon et al. | |
| 6,481,012 B1 | 11/2002 | Gordon et al. | |
| 6,621,870 B1 | 9/2003 | Gordon et al. | |
| 6,651,252 B1 | 11/2003 | Gordon et al. | |
| 6,661,448 B2 | 12/2003 | Lunden | |

(Continued)

FOREIGN PATENT DOCUMENTS

WO        WO 99/60521        11/1999

OTHER PUBLICATIONS

Transporting videos across ATMs from Electronic Engineering Times, p. 56 dated Feb. 13, 1995 by Daniel Reininger.

*Primary Examiner* — Jun Fei Zhong
(74) *Attorney, Agent, or Firm* — Merchant & Gould P.C.

(57) ABSTRACT

Techniques to deliver targeted advertisements and multimedia contents to viewers. Various types of advertisements are encoded and transmitted. The advertisements may be targeted for different coverage areas (e.g., national and local levels) and may further include various categories (e.g., kids, sports, business, and so on). At the terminal, one or more advertisements may be selected for display based on various selection schemes. The particular advertisement to be selected for display at a terminal may be based on the terminal's assigned profile or user interaction at the terminal. The profile may be assigned based on the last program viewed at the terminal, a particular filter icon selected at the terminal, the observed television viewing habits of the viewer at the terminal, and so on. The techniques may also be advantageously used for delivery of other multimedia contents and for other applications.

17 Claims, 4 Drawing Sheets

(56) References Cited

U.S. PATENT DOCUMENTS

| | | |
|---|---|---|
| 6,738,978 B1 | 5/2004 | Hendricks et al. |
| 6,754,271 B1 | 6/2004 | Gordon et al. |
| 6,754,905 B2 | 6/2004 | Gordon et al. |
| 7,519,982 B1 | 4/2009 | Gordon et al. |
| 7,970,645 B2 * | 6/2011 | Gordon et al. ............ 705/14.26 |
| 2002/0054062 A1 | 5/2002 | Gerba et al. |
| 2002/0103876 A1 | 8/2002 | Chatani et al. |
| 2008/0201740 A1 | 8/2008 | Boyer et al. |

* cited by examiner

METHOD AND APPARATUS FOR PROVIDING TARGETED ADVERTISEMENTS

CROSS-REFERENCE TO RELATED APPLICATIONS

This patent application is a continuation of U.S. Pat. No. 7,970,645, entitled "METHOD AND APPARATUS FOR PROVIDING TARGETED ADVERTISEMENTS," filed on Feb. 23, 2001 and assigned to the same assignee as this application. The aforementioned patent application is expressly incorporated herein by reference.

BACKGROUND OF THE INVENTION

The present invention relates to communication systems in general. More specifically, the invention relates to techniques for providing targeted advertisements and multimedia contents in a server-centric system.

Over the past few years, the television industry has seen a transformation in a variety of techniques by which its programming is distributed to consumers. Cable television systems are doubling or even tripling system bandwidth with the migration to hybrid fiber coax (HFC) cable plant. Direct broadcast satellite (DBS) systems have also emerged as a viable alternative to customers unwilling to subscribe to local cable systems. A variety of other approaches have also been attempted, which focus primarily on high bandwidth digital technologies, intelligent two-way set top terminals, or other methods to try to offer services differentiated from those of standard cable and over-the-air broadcast systems.

With the increase in bandwidth, the number of programming choices has increased tremendously. Correspondingly, the number of advertisements and other multimedia contents has also increased. The large amounts of available programming and contents have made it increasingly difficult for a viewer to determine what is available from the system and to intelligently plan viewing.

To assist the viewer with viewing and planning, elaborate systems have been developed to provide an interactive listing of a vast array of channel offerings, expanded textual information about individual programs, and the ability to look forward as much as several weeks in advance to plan television viewing. However, these guide systems generally cover programming selectable by viewers. Advertisements and other multimedia contents are typically not covered by these guide systems so the viewers are often unaware of the types of advertisements being provided. Moreover, the viewers typically have no inputs on the transmission or selection of the advertisements at the terminal. Thus, no means is typically provided to ensure that the advertisements and other multimedia contents are properly targeted to the viewers (e.g., to enhance their effectiveness).

Therefore, techniques to efficiently and effectively deliver targeted advertisements and other multimedia contents to viewers are highly desirable.

SUMMARY OF THE INVENTION

The present invention provides techniques to deliver targeted advertisements and multimedia contents. In an aspect, various types of advertisements are encoded and transmitted from a server (e.g., a head-end and/or local neighborhood equipment) of an information distribution system. The advertisements may be targeted for different coverage areas (e.g., national and local levels) and may further be for various categories (e.g., kids, sports, business, and so on). At the terminal, one or more of the transmitted advertisements may be selected for display based on various selection schemes.

In an aspect, a particular advertisement to be selected for display at a terminal is based on a profile assigned to the terminal. The profile may be used to describe, classify, and/or categorize the terminal (or the one or more viewers associated with the terminal). The profile may be assigned based on, for example, (1) the last program viewed at the terminal, (2) a particular "filter icon" (e.g., Kids, Sports, and so on) selected at the terminal, (3) the observed television viewing habits of the viewer at the terminal, (4) some other profile assignment scheme, or (5) a combination thereof. The assigned profile may thereafter be used to select one of the transmitted advertisements that best matches the viewer's preferences.

In another aspect, the particular advertisement to be selected for display is based on user interaction at the terminal. In an embodiment, the selected advertisement is based on the particular type of programming selected by the viewer. In another embodiment, the viewer is able to select (e.g., via a user interface menu) the particular category of advertisement to be displayed. This allows the viewer to specifically identify and receive the advertisements of most interest to the viewer. By observing the viewer's interaction and selections, specific advertisements may also be targeted at the viewer based on the viewer's preferences.

The techniques described herein may also be advantageously used for the delivery of other multimedia contents and for other applications. For example, these techniques may be used in conjunction with an interactive program guide to provide targeted advertisements, previews, and so on to viewers. The invention further provides other methods and system elements (i.e., terminal and server) that implement various aspects, embodiments, and features of the invention, as described in further detail below. The foregoing, together with other aspects of this invention, will become more apparent when referring to the following specification, claims, and accompanying drawings.

BRIEF DESCRIPTION OF THE DRAWINGS

The teachings of the invention can be readily understood by considering the following detailed description in conjunction with the accompanying drawings.

To facilitate understanding, identical reference numerals have been used, where possible, to designate identical elements that are common within a figure.

DESCRIPTION OF THE SPECIFIC EMBODIMENTS

A. Advertisement System
1. Information Distribution System

Figure 1:
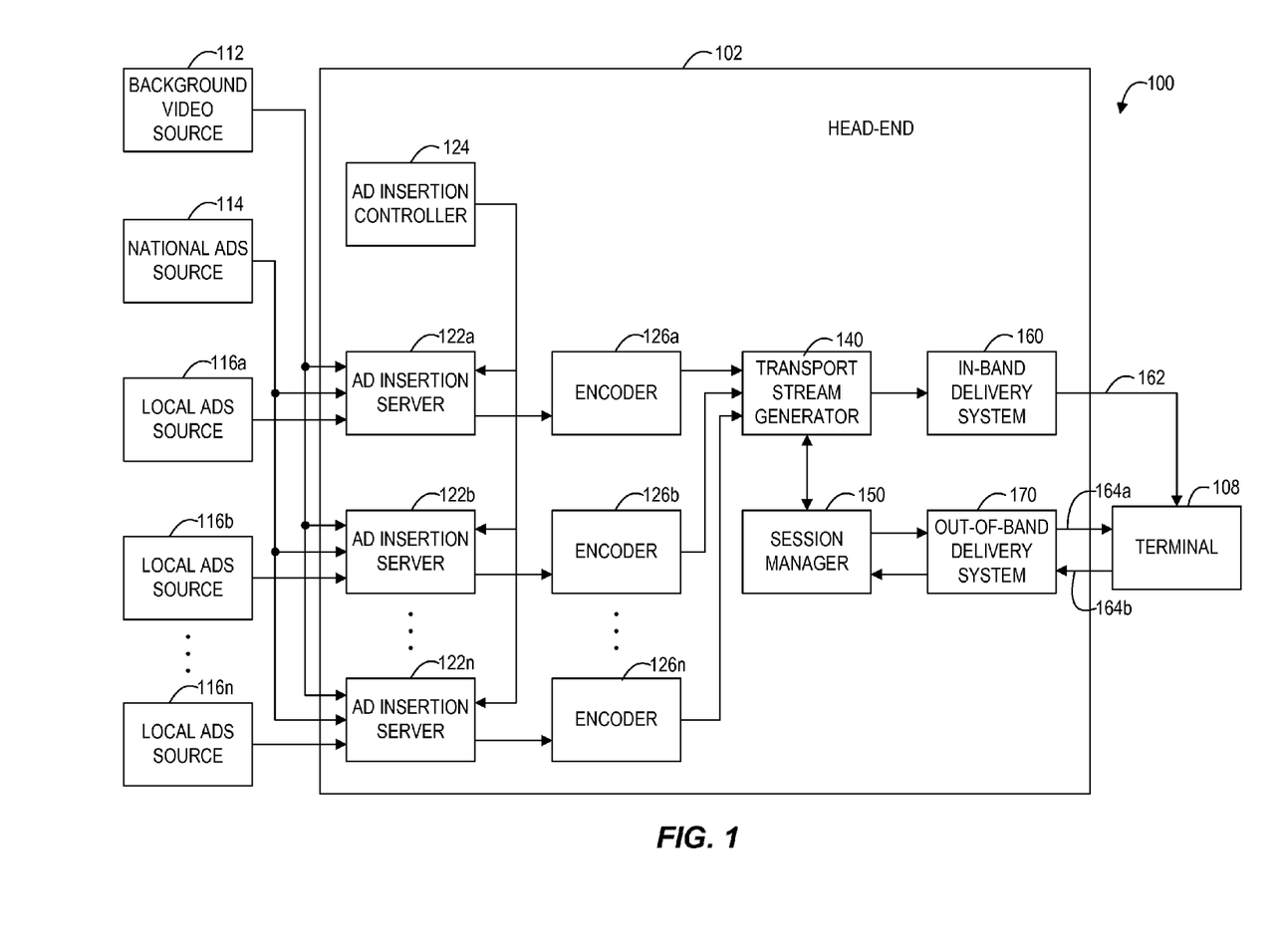
FIG. 1 is a block diagram of an embodiment of an information distribution system that may be used to distribute advertisements and implement various aspects of the invention.

FIG. 1 is a block diagram of an embodiment of an information distribution system 100 that may be used to distribute advertisements and implement various aspects of the invention. Distribution system 100 includes a head-end 102 that communicates with a number of terminals 108 directly via a distribution node (e.g., a hybrid fiber-coax network) or indirectly via local neighborhood equipment (LNE) that further communicates with the terminals via the distribution node (only one terminal, and no LNE or distribution node, is shown in FIG. 1 for simplicity). Each LNE may serve one or more distribution nodes, and each distribution node is typically associated with a respective neighborhood that includes a number of terminals.

Within distribution system 100, a background video source 112 provides background videos that may be used for the background of a video screen (e.g., a user interface), a first advertisements source 114 provides a first set of advertisements, and second advertisements sources 116*a* through 116*n* provides second sets of advertisements. These sets of advertisements include videos and their associated audios, and may pertain to different coverage areas (e.g., national and local levels) and/or may correspond to different categories of advertisements. For example, the first set of advertisements may be provided to a number of distribution nodes and each second set of advertisements may be provided to a respective distribution node. Additional and/or different sources for advertisements and/or other multimedia contents may also be utilized and are within the scope of the invention.

The background videos and advertisements are provided to each of a number of ad insertion servers 122 within head-end 102. Each ad insertion server 122 inserts a respective selected set of (e.g., national and local) advertisements into the background video, as directed by an ad insertion controller 124. Each ad insertion server 122 thus forms a respective set of one or more composed videos that is then provided to an associated encoder 126.

Ad insertion controller 124 selects the advertisements to be provided to the terminals and further determines the schedule for the ad insertion. The ad selection may be based on a set of business rules, viewer preferences, and/or other factors. Ad insertion controller 124 couples to ad insertion servers 122 and manages the ad insertion process such that the desired composed videos are generated.

Each encoder 126 includes a video encoder (e.g., a real-time MPEG-2 encoder) that encodes the received composed video(s) based on a particular encoding technique and provides one or more (e.g., MPEG-2 compliant) bitstreams for the encoded videos. Each video encoder 126 is designed to efficiently and effectively encode the respective received video(s), and may implement "slice-based", "picture-based," "temporal slice persistence," "strobecast", or some other encoding technique. Encoders 126 provide a number of elementary streams containing (e.g., picture-based or slice-based) encoded videos. Encoder 126 may further include an audio encoder (e.g., a Dolby AC-3 encoder) that encodes the audio(s) associated with the composed video(s) and provides one or more bitstreams for the encoded audios.

Picture-based encoding is described in detail in U.S. Pat. No. 6,621,870, entitled "METHOD AND APPARATUS FOR COMPRESSING VIDEO SEQUENCES," issued Sep. 16, 2003. Slice-based encoding is described in detail in U.S. Pat. No. 6,651,252, entitled "METHOD AND APPARATUS FOR TRANSMITTING VIDEO AND GRAPHICS IN COMPRESSED FORM," issued Nov. 18, 2003. Temporal slice persistence encoding is described in detail in U.S. Pat. No. 6,754,271, entitled "TEMPORAL SLICE PERSISTENCE METHOD AND APPARATUS FOR DELIVERY OF INTERACTIVE PROGRAM GUIDE," issued Jun. 22, 2004. Strobecast encoding and delivery is described in detail in U.S. Pat. No. 7,519,982, entitled "EFFICIENT DELIVERY OF INTERACTIVE PROGRAM GUIDE USING DEMAND-CAST," issued Apr. 14, 2009. These patents are incorporated herein by reference.

A transport stream generator (TSG) 140 receives and assembles the elementary streams from encoders 126 into one or more transport streams. Transport stream generator 140 further manages each transport stream and communicates with a session manager 150 to form and/or tear down transport streams. In an embodiment, each transport stream is an MPEG-compliant transport stream. In this case, transport stream generator 140 may send program tables in a private section of the MPEG transport stream, as is known in the art.

Session manager 150 manages the delivery of advertisements and multimedia contents to the terminals and may receive terminal requests via a back channel. In an embodiment, the transport streams for each distribution node include "broadcast" streams (e.g., for advertisements continually sent by the head-end) and "demand-cast" streams (e.g., for advertisements sent by the head-end in response to requests from the terminals). For some implementations, session manager 150 may monitor the demand-cast streams and usage by the terminals and direct the appropriate transport stream generator to generate or tear down demand-cast streams.

An in-band delivery system 160 (e.g., a cable modem) receives and modulates the transport streams from transport stream generator 140 using a modulation format suitable for transmission over an in-band communication channel 162, which may be, for example, a fiber optic or coaxial channel capable of delivering high-speed data from the head-end to the terminals (e.g., via the local neighborhood equipment and/or distribution node). Each local neighborhood equipment may select the programming (e.g., the particular advertisements) that is applicable to its neighborhood and re-modulate the selected contents into a format suitable for transmission over the associated distribution node(s).

An out-of-band delivery system 170 supports the communication between the head-end and the terminals via an out-of-band network 164. On the forward path from the head-end to the terminals, out-of-band delivery system 170 receives and modulates the bitstreams from session manager 150 using a modulation format suitable for transmission over out-of-band communication channel 164*a*, which may be, for example, a telephone line, another frequency range in the fiber-optic or coaxial cable used for the in-band channel, or some other communication link. And on the reverse path from the terminals to the head-end, out-of-band delivery system 170 receives and demodulates the transmissions from the terminals and provides the recovered messages and data to session manager 150.

In FIG. 1, the ad insertion servers are shown as being located within the head-end. An ad insertion server may alternatively or additionally be located in the local neighborhood equipment to allow for insertion of local (i.e., targeted) advertisements based on certain decisions and criteria. For a distributed advertisement system, the local neighborhood equipment may include the ad insertion server and associated encoder. Some of the functionalities provided by the transport stream generator and session manager may also be distributed to the local neighborhood equipment.

The encoders and transport stream generator, which may reside at the head-end, generate one or more (e.g., recombinant MPEG) transport streams, with each transport stream containing a number of elementary video streams, audio streams, and (possibly) data streams. The transport stream is broadcast (or demand-cast) over the distribution node (e.g., a cable network) and received by a number of terminals (e.g., settop-boxes) executing one or more applications, including a (recombinant MPEG) decoding application. The terminal demultiplexes the received transport stream, extracts and decodes the desired elementary video streams and associated audio streams, presents the decoded videos on a display unit (e.g., a television), and may further extract the data stream for execution by a host processor within the terminal.

2. Advertisement Videos Transmission and Display

Information distribution system 100 may be used to deliver advertisements of various types and using various different formats. In one embodiment, each advertisement video is encoded as a full-size video and transmitted via a respective elementary stream identified by an assigned packet identifier (PID). In another embodiment, one or more advertisement videos are inserted into a background video to form a composed video that is then encoded and transmitted. In yet another embodiment, a number of advertisement videos are received, reduced in size, and m g e d into a grid that is then encoded. Each encoded advertisement video may thereafter be transmitted via a respective PID.

Figure 2:
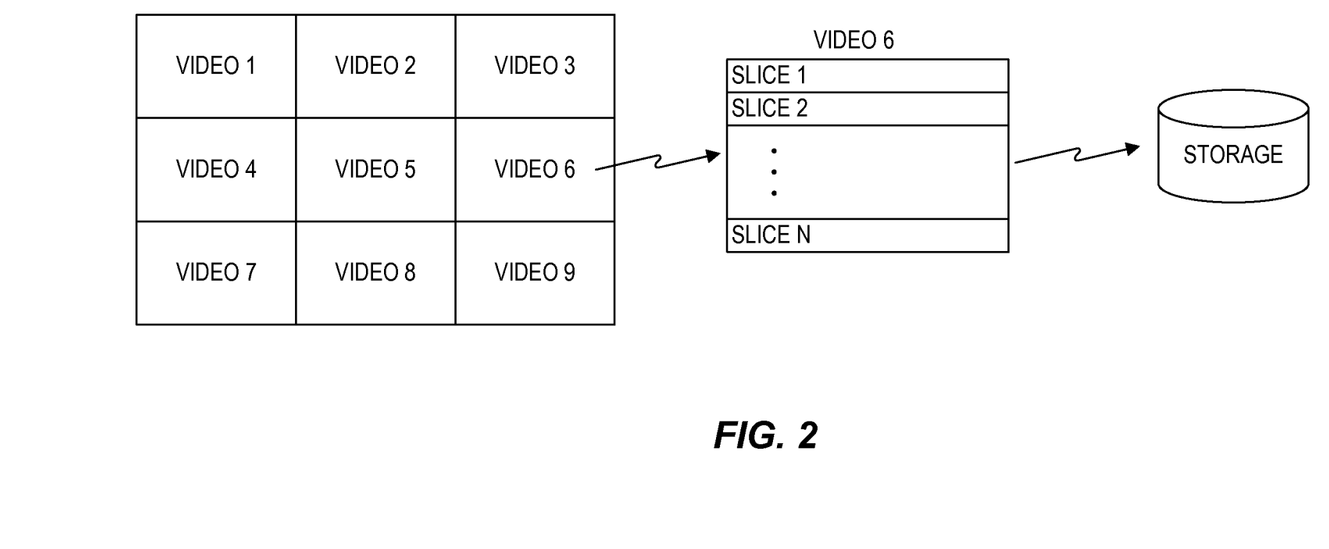
FIG. 2 is a diagram illustrating a technique to efficiently encode a number of advertisement videos in accordance with an aspect of the invention.

FIG. 2 is a diagram illustrating a technique to efficiently encode a number of advertisement videos in accordance with an aspect of the invention. For picture-in-picture (PIP) or picture-in-application (PIA), each ad insertion server 122 may receive a number of advertisement videos and form a composed video having included therein the advertisement videos in scaled size (i.e., reduced in size).

In the specific embodiment shown in FIG. 2, nine advertisement videos are received, reduced in size, and arranged into a 3×3 matrix on one full-size video screen. Each of the nine videos is displayed at 113 of the full horizontal resolution and 113 of the full vertical resolution. Different vertical and horizontal resolutions may also be used (e.g., 112, 114, and so on), depending on the desired size of the advertisement videos, and are within the scope of the invention.

Encoder 126 receives the composed video having the nine resized advertisement videos and encodes the composed video to generate one or more video elementary streams. In an embodiment, the encoding is achieved using "picture-in-picture encoding" whereby the matrix of nine advertisement videos is encoded as a motion video (e.g., using one video encoder). However, each advertisement video can be defined with a set of slices (e.g., slices 1 through N). In this way, a large number of videos can be encoded using a reduced number of encoders (e.g., one). The encoding of the nine videos as a composed video and using slice-based encoding can be achieved as described in U.S. Pat. No. 6,481,012, entitled "PICTURE-IN-PICTURE AND MULTIPLE VIDEO STREAMS USING SLICE-BASED ENCODING," issued Nov. 12, 2002, is incorporated herein by reference.

The encoded slices for each advertisement video may then be stored to a storage device and/or transmitted by the head-end. Thereafter, each of the encoded and stored advertisement videos may be individually transmitted from the head-end, as desired or whenever requested, via an appropriately identified elementary stream. The transmitted advertisement videos may be flexibly recombined with other videos and/or contents at the terminal (e.g., to implement PIP or PIA).

A number of advertisements may be transmitted from the head-end. Each advertisement is typically a motion video sequence that may, in an embodiment, be selected at the terminal, processed, and displayed. Depending on the format of the selected advertisement, the motion video sequence may be displayed on a full screen or within a video window on the screen. The selected advertisement may thus be recombined with other videos and/or contents that are displayed outside the video window.

As a specific example, a number of motion video sequences may be transmitted by the head-end for possible display on a user interface at the terminal. The user interface may include a number of regions, with one of the regions being defined as a video window that may be used to display a motion video sequence. Based on a particular selection scheme, one of the transmitted motion video sequences can be selected, processed, and displayed in the video window of the user interface. Other contents are also typically displayed in other regions of the user interface. Different motion video sequences may be selected for display in the video window depending on various factors, as described in further detail below.

3. Video Selection Based on Assigned Profile

In accordance with an aspect of the invention, the particular motion video sequence to be selected for display (e.g., in the video window) is based on a profile assigned to a terminal. The profile may be used to describe, classify, and/or categorize the terminal (or the one or more viewers at the terminal). The assigned profile may thereafter be used to select the particular motion video sequence (and the associated audio) that best matches the viewer's preferences.

The profile may be assigned in accordance with a number of schemes and may be based on various criteria. Some profile assignment schemes are described below. Other schemes may also be implemented and are within the scope of the invention.

In a first profile assignment scheme, the terminal's profile is assigned based on the last program viewed at the terminal. For this scheme, the terminal can determine the program type (e.g., cartoon, football game, news, and so on) for the program last viewed at the terminal. The terminal can then be assigned a profile of a particular defined program type that best matches the determined program type. For example, the assigned profile for the terminal may be "Kids," "Sports" or "Business" if the determined program type for the last viewed program is cartoon, football game, or news, respectively. Each defined program type represents a specific category, and different and/or additional categories than those listed above may be defined for assignment to the terminals.

In a second profile assignment scheme, the particular "filter icon" (e.g., Kids, Sports, and so on) selected at the terminal is used to assign the terminal's profile. The screen may be designed to be associated with and/or display a number of filter icons. As an example, a user interface (e.g., an interactive program guide) may be provided with a number of viewer selectable filter icons, with each filter icon being used to select a particular type of programming to be included in a program listing provided on the user interface. For this user interface, the profile of the terminal may be assigned the filter icon selected by the viewer.

In a third profile assignment scheme, the terminal's profile is assigned based on the observed television viewing habits of the viewer. For this scheme, the viewing habits at the terminal can be observed and tracked over a period of time. In one embodiment, the tracking of viewing habits can be performed by a session manager used to manage the delivery of contents to the terminals. The session manager may be located at the head-end (as shown in FIG. 1) or at the local neighborhood equipment. In another embodiment, the tracking of viewing habits can be performed at the terminal, which can then report the results to the head-end.

In an embodiment, which is especially applicable for the third profile assignment scheme, the assigned profile may include different categories for different time spans. As a specific example, the assigned profile for Saturday morning may be Kids if cartoons are normally viewed on Saturday morning, the assigned profile for Monday night may be Sports if Monday Night football is normally viewed on Monday night, and the assigned profile for other week nights may be Business if evening news is normally viewed on other week nights. Thus, a different profile category may be assigned to the terminal for each defined time span that best fits the observed television viewing habits during that time span.

As noted above, depending on the particular profile assigned to the terminal, a particular motion video sequence (and the associated audio) that best matches the assigned profile may be selected, processed, and displayed on the video window. In this manner, specific advertisements may be targeted at the viewer based on the viewer's preferences, which is reflected in the profile assigned to the terminal.

4. Video Selection Based on User Interaction

In accordance with another aspect of the invention, the particular motion video sequence to be displayed in the video window is selected based on user interaction at the terminal. By observing the viewer's interaction and selections, specific advertisements may be targeted at the viewer based on the viewer's preferences.

In an embodiment, the particular motion video sequence selected for display is based on the particular type of programming selected by the viewer at the terminal. For the above-described user interface that includes a number of viewer selectable filter icons, the particular motion video sequence selected for display may be based on, for example, the particular filter icon selected by the viewer.

In another embodiment, the viewer is able to select the particular category for the motion video sequence to be displayed. This allows the viewer to specifically identify and receive the motion video sequence of most interest to the viewer. The viewer selection may be received via a user interface menu.

5. Delivery of Motion Video Sequences

In an embodiment, a complete set of motion video sequences may be broadcast (i.e., continually transmitted) by the head-end in one or more transport streams and made available to the terminals. For this embodiment, the terminal is able to retrieve any particular motion video sequence whenever selected. In another embodiment, a limited set of motion video sequences may be broadcast by the head-end and other motion video sequences may be sent as demand-cast (i.e., transmitted whenever requested by the terminal).

If the viewer desires a particular advertisement that is not provided by the broadcast streams, then a demand-cast session may be initiated, for example, as described in the aforementioned U.S. Pat. No. 7,519,982. For this demandcast session, the terminal sends a message to the head-end via the back channel requesting the desired contents. The head-end processes the request, retrieves the desired contents from an appropriate source, generates a video stream (and possibly audio stream) for the desired contents, and incorporates the video stream into a transport stream. The terminal then retrieves the desired video stream from the transport stream.

B. Interactive Program Guide

One such application for targeted contents delivery is for an interactive program guide (IPG). During a television viewing session, a viewer may launch an IPG application at the terminal. In response, a video window on the screen may be updated to display a particular promotional content selected from a set of motion video sequences. For the IPG, the set of motion video sequences may be chosen from different categories such as, for example, Movies, Kids, Sports, Business, and so on. For example, if the viewer selects a Movies icon, a movies-related motion video sequence may be displayed on the video window. And if the viewer selects a Sports icon, a sports-related motion video sequence may be displayed on the video window.

1. Interactive Program Guide

The techniques described above for transmitting targeted advertisements may be used for, or in conjunction with, various applications. For example, these techniques may be used to provide targeted advertisements, previews, and so on, to viewers for an interactive program guide.

Figure 3:
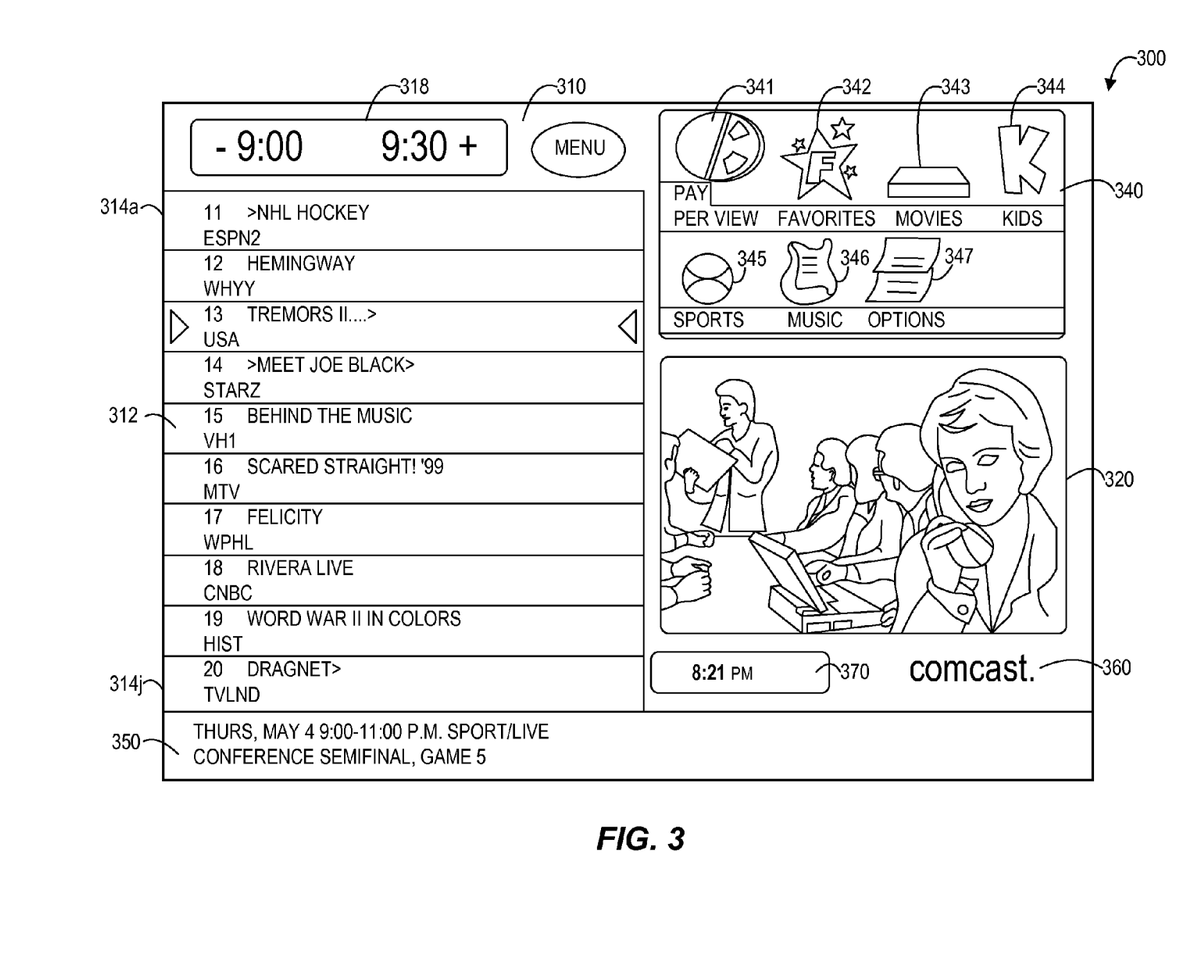
FIG. 3 is a diagram of a specific design of an IPG page used to present a program listing and other information.

FIG. 3 is a diagram of a specific design of an IPG page 300 used to present a program listing and other information (e.g., advertisements) to viewers. In this design, IPG page 300 includes a guide region 310, a video region 320, an icon region 340, a program description region 350, a logo region 360, and a time-of-day region 370. Other designs for the IPG page with different layouts, configurations, and combinations and arrangements of regions and objects can be contemplated and are within the scope of the invention.

In an embodiment, guide region 310 includes a guide grid region 312 and a time slot region 318. Time slot region 318 includes time slot objects (e.g., 9:00 and 9:30) that indicate the (e.g., half-hour) time slots for which program guide is being provided on the IPG page. Guide grid region 312 is used to display a program listing for a group of channels. In an embodiment, the available programming is shown in two half-hour time slots. Guide grid region 312 includes a number of channel objects 314a through 314j used to display program information for the group of channels.

Program description region 350 is used to present descriptive information relating to a particular program selected from the program listing, or may be used to present other information. Video region 320 may be used to display images, videos, text, or a combination thereof, which may be used for advertisements, previews, or other purposes. In the design shown in FIG. 3, video region 320 displays an advertisement video. Logo region 360 may include a logo of a service operator or other entity, and may be optionally displayed. Time-of-day region 370 may be configurable by the user and may also be optionally displayed.

Icon region 340 is used to display various icons. Each icon can represent a filter or a link to either another IPG page or a particular interface. Each filter selects a particular type of programming to be included in the program listing shown in guide region 310. For example, a "Pay Per View" (PPV) icon 341 may be a filter that selects only PPV programming to be included in the program listing. A "Favorites" icon 342 may be a filter that selects only channels designated by the viewer to be among his or her favorites. A "Movies" icon 343 may be a filter that selects only movies or movie channels. A "Kids" icon 344 may be a filter that selects only channels for children or programming appropriate or produced for viewing by children. A "Sports" icon 345 may be a filter that selects only sports channels or sports-related programming. A "Music" icon 346 may be a link to a music interface and an "Options" icon 347 may be a link to a menu of IPG options that the viewer may select amongst.

An example user interface and user interaction design is described for an interactive program guide system in the U.S. Pat. No. 6,754,905, entitled "DATA STRUCTURE AND METHODS FOR PROVIDING AN INTERACTIVE PROGRAM GUIDE," issued Jun. 22, 2004, and U.S. Pat. No. 6,208,335, entitled "METHOD AND APPARATUS FOR PROVIDING A MENU STRUCTURE FOR AN INTERACTIVE INFORMATION DISTRIBUTION SYSTEM," issued Mar. 27, 2001, both incorporated herein by reference.

As described above, a number of advertisement videos may be broadcast from the head-end. These broadcast advertisements may be of different categories (e.g., kids, sports, business, and so on). For the IPG page shown in FIG. 3, various advertisement videos may be selected for displayed in video region 320. For example, the particular advertisement video to be displayed may be selected based on (1) the particular channel in the guide region highlighted by the viewer, (2) the particular filter in the icon region selected by the viewer, (3) the profile assigned to the terminal based on the observed viewing habits of the viewer, (4) a selection made by the viewer (e.g., via the options menu), or (5) others.

C. Terminal

1. Terminal

Figure 4:
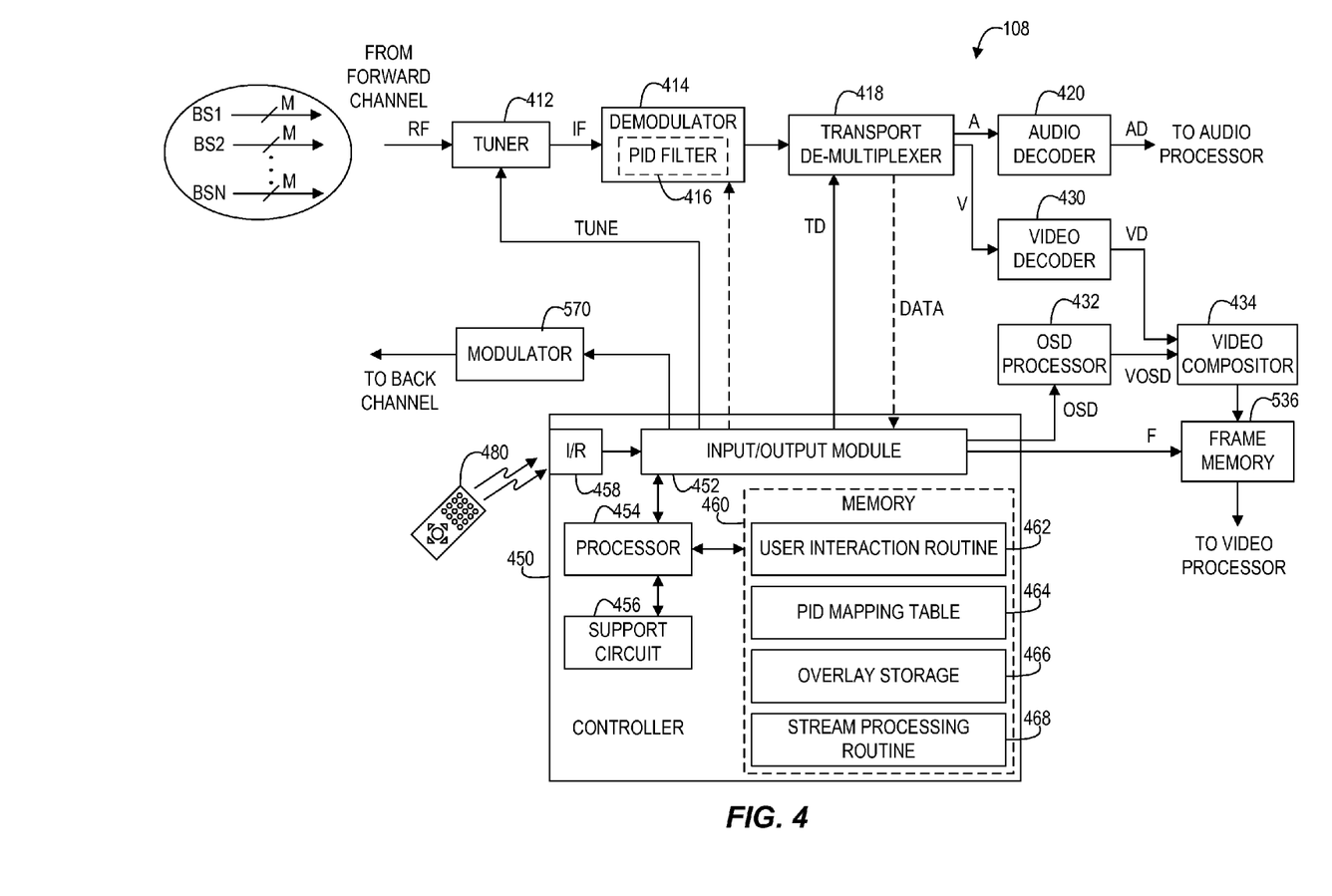
FIG. 4 is a block diagram of an embodiment of a terminal capable of providing a display of a user interface and implementing various aspects of the invention.

FIG. 4 is a block diagram of an embodiment of terminal 108, which is also referred to as a set top terminal (STT) or user terminal. Terminal 108 is capable of producing a display of a user interface and implementing various aspects of the invention. Terminal 108 includes a tuner 412, a demodulator 414, a transport demultiplexer (DEMUX) 418, an audio decoder 420, a video decoder 430, an on-screen display (OSD) processor 432, a video compositor 434, a frame store memory 436, a controller 450, and a modulator 470. User interaction is supported via a remote control unit 480. Tuner 412 receives a radio frequency (RF) signal comprising, for example, a number of quadrature amplitude modulated (QAM) signals from a downstream (forward) channel. In response to a control signal TUNE, tuner 412 tunes to and processes a particular QAM signal to provide an intermediate frequency (IF) signal. Demodulator 414 receives and demodulates the IF signal to provide an information stream (e.g., an MPEG transport stream) that is sent to transport stream demultiplexer 418.

Transport stream demultiplexer 418, in response to a control signal TD produced by controller 450, demultiplexes (i.e., extracts) an audio stream A and a video stream V. The audio stream A is provided to audio decoder 420, which decodes the audio stream and provides a decoded audio stream to an audio processor (not shown) for subsequent processing and presentation. The video stream V is provided to video decoder 430, which decodes the compressed video stream V and provides an uncompressed video stream VD to video compositor 434. OSD processor 432, in response to a control signal OSD produced by controller 450, produces a graphical overlay signal VOSD that is provided to video compositor 434.

Video compositor 434 merges the graphical overlay signal VOSD and the uncompressed video stream VD to produce a composed video stream (i.e., the underlying video images with the graphical overlay). Frame store unit 436 receives and stores the composed video stream on a frame-by-frame basis according to the frame rate of the video stream. Frame store unit 436 thereafter provides the stored video frames to a video processor (not shown) for subsequent processing and presentation on a display device. In an embodiment, during transitions between streams for a user interface, the buffers in the terminal are not reset, and the user interface seamlessly transitions from one screen to another.

Controller 450 includes an input/output (I/O) module 452, a processor 454, support circuitry 456, an infrared receiver (I/R) 458, and a memory 460. Input/output module 452 provides an interface between controller 450 and tuner 412, demodulator 414 (for some designs), transport demultiplexer 418, OSD processor 432, frame store unit 436, modulator 470, and a remote control unit 480 via infrared receiver 458.

Processor 454 interfaces with I/O module 452, support circuitry 456 (which may include power supplies, clock circuits, cache memory, and the like), and a memory 460. Processor 454 also coordinates the execution of software routines stored in memory 460 to implement the features and perform the functions supported by the terminal.

Memory 460 stores software routines that support various functions and features, and further stores data that may be used for the user interface. In the embodiment shown in FIG. 4, memory 460 includes a user interaction routine 462, a PID mapping table 464, an overlay storage 466, and a stream processing routine 468. User interaction routine 462 processes user interactions to perform various functions to provide the desired user interface menu. For example, user interaction routine 462 can implement a mask or reveal feature to display (reveal) the desired portion of the IPG page and hide (mask) the undesired portion. User interaction routine 462 may further perform various functions to achieve a demandcast for a desired IPG page. The mask or reveal is described in U.S. Pat. Nos. 6,754,905 and 6,208,335.

Stream processing routine 468 coordinates the recombination of video streams to form the desired video sequences. Stream processing routine 468 employs a variety of methods to recombine slice-based streams, some of which are described in the aforementioned U.S. Pat. No. 6,754,271. In one recombination method, a PID filter 416 within demodulator 414 is utilized to filter the undesired PIDs and retrieve the desired PIDs from the transport stream. The packets to be extracted and decoded to form a particular IPG page are identified by PID mapping table 464. For most recombination methods, after stream processing routine 468 has processed the streams into the proper order, the slices are sent to video decoder 430 (e.g., an MPEG-2 decoder) to form uncompressed IPG pages suitable for display.

Although controller 450 is depicted as a general-purpose processor that may be programmed to perform specific control functions to implement various aspects of the invention, the controller may also be implemented in hardware as an application specific integrated circuit (ASIC).

In a specific design, remote control unit 480 includes an 8-position joystick, a numeric pad, a "Select" key, a "Freeze" key, and a "Return" key. User manipulations of the joystick or keys on the remote control device are transmitted to controller 450 via an infrared (IR) link or an RF link. Controller 450 is responsive to the user manipulations and executes the appropriate portion of user interaction routine 462 to process the user manipulations.

FIG. 4 shows a specific design of terminal 108. Other designs of the terminal can also be implemented to perform the functions described herein, and these alternative designs are within the scope of the invention.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. An information distribution system, comprising:
   a terminal to produce a user interface at a user display device;
   a delivery system, coupled to the terminal and configured to transmit content to the terminal; and
   a distribution server, coupled to the terminal through the delivery system, the distribution server controlling delivery of content to the terminal, the distribution server further comprising:

an insertion controller, for selecting content for display at the terminal in accordance with a terminal profile, at least one insertion server configured to receive at least one background video, comprising the user interface, and sets of content associated with different coverage areas, different categories and different sources, the sets of content including first and second sets of content for first and second coverage areas, respectively, and to compose one or more videos having included therein content from the first and second sets wherein the included content is spatially arranged into one or more videos displayed in one or more video windows disposed in the user interface;

at least one encoder, each encoder coupled to a respective insertion server and configured to encode the one or more composed videos in accordance with a particular coding scheme to form one or more encoded videos; and a transport stream generator coupled to the at least one encoder and configured to multiplex the one or more encoded videos into one or more transport streams corresponding to the content selected by the insertion controller for display at the terminal;

wherein the user interface generated by the terminal includes a filter region having at least one filter icon displayed therein, a program listing region for displaying a grid of program listings, and a video region for displaying videos, the terminal profile being assigned by selection of a filter icon from the filter region displayed on the user interface at the terminal, the terminal profile being used to select, at the terminal, a category of programming associated with the filter icon selected from the filter region, a particular channel in the grid of programming listings, viewing habits for the user and selections made by the user to simultaneously display a grid of program listings and the one or more videos generated by the insertion controller based on filtering the one or more transport streams according to the terminal profile, the terminal profile being assigned according to the last program viewed at the terminal and the viewing habits associated with a given time and day, such that a presently displayed configuration of the user interface is based on a terminal profile relevant to the given time and day.

2. The information distribution system of claim 1, wherein the insertion controller schedules transmission of the first and second sets of content.

3. The information distribution system of claim 1, wherein the composing and encoding are performed at a head-end.

4. The information distribution system of claim 1, wherein the composing and encoding are distributed among a head-end and local neighborhood equipment.

5. The information distribution system of claim 1, wherein the first and second sets of content are targeted for first and second coverage areas, respectively, and wherein the second coverage area encompasses the first coverage area and additional areas.

6. The information distribution system of claim 1, wherein the first set of content is targeted for a plurality of distribution nodes and the second set of content is targeted for a particular distribution node.

7. The information distribution system of claim 1, wherein at least one composed video includes a plurality of advertisements reduced in size and arranged in a non-overlapping arrangement.

8. The information distribution system of claim 1, wherein each advertisement in the first and second sets of content include advertisements and each advertisement in the first and second sets of content is defined with a set of slices, and wherein the slices for each advertisement are encoded and transmitted via a respective packet identifier (PID).

9. A method for providing an information distribution system, comprising:

receiving at least one background video stream, comprising the user interface, and sets of content associated with different coverage areas, different categories and different sources, the sets of content including first and second sets of content video streams for first and second coverage areas, respectively, and to compose one or more videos having included therein content from the first and second sets wherein the included content video streams are spatially arranged into one or more videos displayed in one or more video windows disposed in the user interface;

encoding the one or more composed videos in accordance with a particular coding scheme to form one or more encoded videos; and multiplexing the one or more encoded videos into one or more transport streams corresponding to the content selected by the insertion controller for display at the terminal;

presenting a user interface that includes a filter region having at least one filter icon displayed therein, a program listing region for displaying a grid of program listings, and a video region for displaying videos, the terminal profile being assigned by selection of a filter icon from the filter region displayed on the user interface at the terminal, the terminal profile being used to select, at the terminal, a category of programming associated with the filter icon selected from the filter region, a particular channel in the grid of programming listings, viewing habits for the user and selections made by the user to simultaneously display a grid of program listings and the one or more videos generated by the insertion controller based on filtering the one or more transport streams according to the terminal profile, the terminal profile being assigned according to the last program viewed at the terminal and the viewing habits associated with a given time and day, such that a presently displayed configuration of the user interface is based on a terminal profile relevant to the given time and day.

10. An information distribution system, comprising:

a delivery system configured to transmit content to a terminal displaying a user interface; and a distribution server, coupled to the terminal through the delivery system, the distribution server controlling delivery of content to the terminal, the distribution server further comprising:

an insertion controller, for selecting content for display at the terminal in accordance with a terminal profile, at least one insertion server configured to receive at least one background video, comprising the user interface, and sets of content associated with different coverage areas, different categories and different sources, the sets of content including first and second sets of content for first and second coverage areas, respectively, and to compose one or more videos having included therein content from the first and second sets wherein the included content is spatially arranged into one or more videos displayed in one or more video windows disposed in the user interface;

at least one encoder, each encoder coupled to a respective insertion server and configured to encode the one or more composed videos in accordance with a particular coding scheme to form one or more encoded videos; and a transport stream generator coupled to the at least one encoder and configured to multiplex the one or more encoded videos into one or more transport streams corresponding to the content selected by the insertion controller for display at the terminal;

wherein the user interface including a grid of program listings and the one or more videos is configured by the insertion controller based on the terminal profile, the terminal profile being assigned according to the last program viewed at the terminal and the one or more viewing habits associated with a given time of day and a given day of a week, such that a presently displayed configuration of the user interface is based on a terminal profile relevant to the given time of day and the given day of a week.

11. The information distribution system of claim 10, wherein the insertion controller schedules transmission of the first and second sets of content.

12. The information distribution system of claim 10, wherein the composing and encoding are performed at a head-end.

13. The information distribution system of claim 10, wherein the composing and encoding are distributed among a head-end and local neighborhood equipment.

14. The information distribution system of claim 10, wherein the first and second sets of content are targeted for first and second coverage areas, respectively, and wherein the second coverage area encompasses the first coverage area and additional areas.

15. The information distribution system of claim 10, wherein the first set of content is targeted for a plurality of distribution nodes and the second set of content is targeted for a particular distribution node.

16. The information distribution system of claim 10, wherein at least one composed video includes a plurality of advertisements reduced in size and arranged in a non-overlapping arrangement.

17. The information distribution system of claim 10, wherein each advertisement in the first and second sets of content include advertisements and each advertisement in the first and second sets of content is defined with a set of slices, and wherein the slices for each advertisement are encoded and transmitted via a respective packet identifier (PID).

* * * * *